United States Patent
Thomas et al.

(10) Patent No.: US 7,519,326 B2
(45) Date of Patent: Apr. 14, 2009

(54) SMART WIRELESS SWITCH

(75) Inventors: Michael Thomas, Grand Blanc, MI (US); Peter Knittl, Kelheim (DE)

(73) Assignee: Infineon Technologies AG, Munich (DE)

( * ) Notice: Subject to any disclaimer, the term of this patent is extended or adjusted under 35 U.S.C. 154(b) by 470 days.

(21) Appl. No.: 11/238,939

(22) Filed: Sep. 29, 2005

(65) Prior Publication Data

US 2007/0072580 A1 Mar. 29, 2007

(51) Int. Cl.
*H04B 7/00* (2006.01)

(52) U.S. Cl. .................. 455/41.2; 455/352; 455/41.1; 340/825.69

(58) Field of Classification Search ............ 455/41.1, 455/41.2, 352; 340/825.69
See application file for complete search history.

(56) References Cited

U.S. PATENT DOCUMENTS

| | | | | |
|---|---|---|---|---|
| 4,779,168 A | * | 10/1988 | Montgomery | 362/543 |
| 5,442,341 A | * | 8/1995 | Lambropoulos | 340/5.26 |
| 5,563,600 A | * | 10/1996 | Miyake | 341/173 |
| 6,005,508 A | * | 12/1999 | Tsui | 341/173 |
| 6,748,797 B2 | | 6/2004 | Breed et al. | |
| 2003/0045239 A1 | * | 3/2003 | Buckingham et al. | 455/66 |
| 2004/0100151 A1 | * | 5/2004 | Smyth | 307/139 |
| 2006/0044152 A1 | * | 3/2006 | Wang | 340/825 |
| 2006/0238371 A1 | * | 10/2006 | Tsay et al. | 340/825.69 |

FOREIGN PATENT DOCUMENTS

| | | |
|---|---|---|
| EP | 0 867 826 A2 | 9/1998 |
| WO | WO 02/20287 A1 | 3/2002 |
| WO | WO 02063916 * | 8/2002 |

* cited by examiner

*Primary Examiner*—Sanh D Phu
(74) *Attorney, Agent, or Firm*—Eschweiler & Associates, LLC

(57) ABSTRACT

One or more aspects of the present invention relate to a wireless switch component and an associated control module component that facilitate wireless control over a load device. The load device is operatively coupled to the control module component and is selectively activated thereby in accordance with a wireless control signal sent by the wireless switch component.

26 Claims, 2 Drawing Sheets

SMART WIRELESS SWITCH

FIELD OF INVENTION

The present invention relates generally to communications systems and more particularly to wireless switching circuitry.

BACKGROUND OF THE INVENTION

It can be appreciated that communications and/or control systems generally require an abundance of wiring, both in industrial and residential applications. By way of example, protective conduit is initially installed in many applications, where such conduit generally comprises metal piping that is run from a switch junction box to a junction box of the load or device being serviced. Once the conduit is in place, wiring is pulled through the piping and then mechanical connections are made between source and load devices to complete the circuit(s).

It can be appreciated that the conduit and wiring can be expensive, and that installing them and making all the necessary connections can take time and be labor intensive. Additionally, where multiple devices are serviced on one or more circuits, these steps have to be performed multiple times. In addition to cost concerns, reliability and safety issues can arise in such arrangements since physical parts of the circuits can wear. For example, wiring and wired connections (which are the medium for electric signals in the circuits) may thin and/or become brittle over time, such as from exposure to temperature extremes and/or carrying excessive currents. Additionally, rodents and/or household pets can chew through wiring creating safety issues. In any event, there are an abundance of cost, reliability and/or safety issues that make it desirable to facilitate wireless communications.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Rather, its primary purpose is merely to present one or more concepts of the invention in a simplified form as a prelude to the more detailed description that is presented later. One or more aspects of the present invention are directed to a wireless switching system that facilitates wireless manipulation or control over one or more devices.

In accordance with one or more aspects of the present invention, a system that facilitates wireless control over a load device is disclosed. The system includes a wireless switch component that is configured to wirelessly send a control signal. A control module component is also included that is operatively coupled to the load device and configured to control the load device in response to the wireless control signal from the wireless switch component.

To the accomplishment of the foregoing and related ends, the following description and annexed drawings set forth in detail certain illustrative aspects and implementations of the invention. These are indicative of but a few of the various ways in which one or more aspects of the present invention may be employed. Other aspects, advantages and novel features of the invention will become apparent from the following detailed description of the invention when considered in conjunction with the annexed drawings.

DETAILED DESCRIPTION OF THE INVENTION

Figure 1:
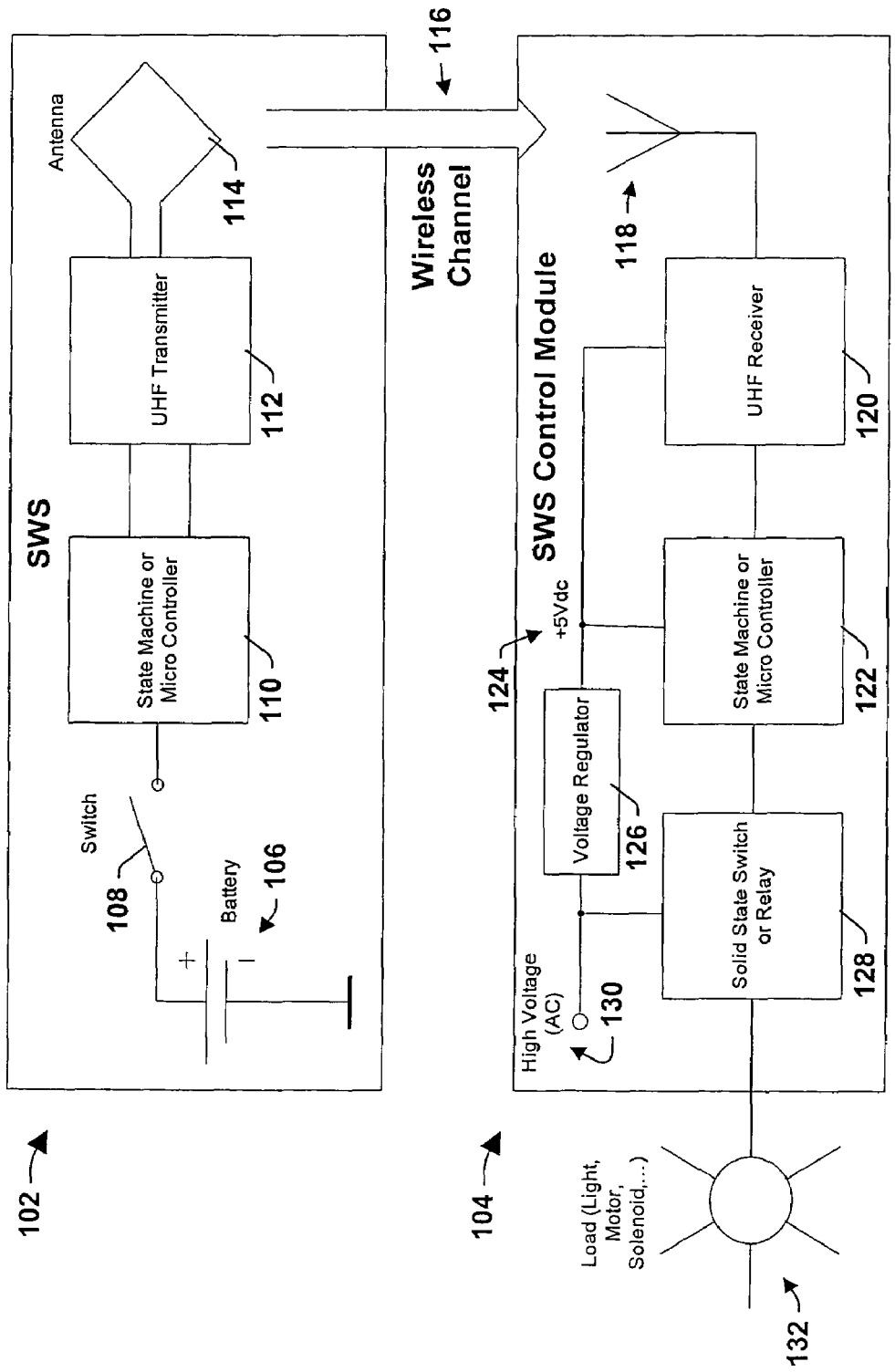
FIG. 1 is a system level block diagram illustrating a smart wireless switch (SWS) and associated control module according to one or more aspects of the present invention.

One or more aspects of the present invention are described with reference to the drawings, wherein like reference numerals are generally utilized to refer to like elements throughout, and wherein the various structures are not necessarily drawn to scale. It will be appreciated that where like acts, events, elements, layers, structures, etc. are reproduced, subsequent (redundant) discussions of the same may be omitted for the sake of brevity. In the following description, for purposes of explanation, numerous specific details are set forth in order to provide a thorough understanding of one or more aspects of the present invention. It may be evident, however, to one of ordinary skill in the art that one or more aspects of the present invention may be practiced with a lesser degree of these specific details. In other instances, known structures are shown in diagrammatic form in order to facilitate describing one or more aspects of the present invention.

FIG. 1 illustrates a smart wireless switch (SWS) component 102 and its operative association with a control module component 104 according to one or more aspects of the present invention. The switch component 102 comprises a battery or power source 106, which generally delivers relatively low power, such as from a low voltage (e.g., a few volt) supply, for example. A contact less, low power or other type of switch 108 is operatively coupled to the power source 106 to selectively couple the power source 106 to a state machine or micro controller component 110. The state machine or micro controller component 110 is in turn operatively coupled to a UHF transmitter component 112 which has an associated antenna 114.

Accordingly, when the switch 102 is closed, power is supplied to the state machine or micro controller component 110 so that one or more signals comprising data, such as switch states and/or commands, for example, are resultantly sent via one or more wireless channels 116 (e.g., over radio frequency (RF) channels) to the control module component 104. The switch component 102 can thus be said to be event driven, where the event may, for example, comprise a driver of a vehicle manually turning on or enabling a turn signal, which effectively closes the switch 108 and ultimately causes a blinker on the vehicle the flash.

The control module component 104 comprises an antenna 118 associated with a UHF receiver 120 to facilitate receiving signals transmitted from the switch component 102. A state machine or micro controller component 122 is coupled to the receiver 120 and to the output 124 of a voltage regulator 126, which may output a low voltage (e.g., 5 volts DC) to power the state machine component 122. A solid state switch or relay 128 is operatively coupled to the state machine component 122 and to a source or power supply 130, which generally comprises a high AC voltage (e.g., 110 volts). The switching component 128 is in turn coupled to a load or device 132, such as one or more lights, motors and/or solenoids, etc.

Accordingly, when a signal generated by the smart wireless switch component 102 is received at the antenna 118 and receiver 120 of the control module 104, the state machine or microcontroller component 122, which is powered by the output 124 of the voltage regulator 126, receives a demodulated signal from the receiver 120, which causes the state machine or microcontroller component 122 to set the appropriate state to assert to the solid state switch or relay component 128. This in turn causes the switch component 128 to trip so that the load 132 is coupled to the supply 130 and powered and activated thereby. It will be appreciated, however, that the load device 132 could be deactivated as well, such as when the switch 108 is opened, for example, and the switch component 102 thus wirelessly transmits a signal telling the control module 104 to turn the device 132 off. It will also be appreciated that turning the device off may merely comprise the absence of an enabling signal from the smart wireless switch component 102.

It will be appreciated that the switch 108 of the smart wireless switch component 102 may sit in a powered up state, and that a change of state of the switching component 108 may cause the state machine or micro controller component 110 to act. Having the switch 108 remain in a powered up state may facilitate a faster response time in the smart wireless switch component 102. In this situation, the state machine 110 would be configured to interpret one or more different states of the switch 108. It will be appreciated that the logic state machines can be developed by first designing logic state diagrams to effect the desired operations of the state machines, and then forming the actual state machines according to the state diagrams. Additionally, the functionalities of the state machines can also be implemented in one or more other formats, such as in an application specific integrated circuit (ASIC), for example.

It will also be appreciated that the switch component 102 and the control component 104 could be outfitted with transceivers to facilitate two way communications. In this manner, feedback could be provided to the switch component 102, for example, regarding the operation of the load. For example, visual and/or audio data could be sent back to the switch component 102 (and/or any other similarly adapted receiver for that matter) regarding whether a light has been enabled/disabled after the switch 108 in the switch component 102 has been closed/opened. It will also be appreciated that the operating frequencies of the switch 102 and control module 104 components (e.g., transmitter 112, receiver 120) may be based upon a crystal reference and geographic region of operation.

It will be appreciated that multiple switch components 102 and multiple control module components 104 may be operated within range of one another in certain applications, such as in automobile applications, for example. Accordingly, the switch components 102 and/or control module components 104 can be outfitted with identification mechanisms, such as address generation and/or encoding circuitry, for example, located within the state machines, micro controller, ASIC components 110, 122, for example, so that particular switch components 102 and control module components 104 have to "match up" before certain communications and actions can take place.

By way of example, where a particular switch component 102 broadcasts within range of multiple control module components 104, but only a couple of devices 132 (e.g., brake lights) are supposed to be controlled by the switch component 102, the particular control modules 104 that the devices are connected to can have addresses that the switch component 102 directs signals to. Similarly, one or more switch component 102 may have addresses that certain control modules 104 look for. More particularly, the control modules 104 may be configured to respond to only those signals generated from switch components 102 having the particular addresses.

Additionally, a single switch component 102 can be configured to control multiple loads where respective addresses are associated with the loads. Similarly, a single control module component may be operatively associated with multiple load devices (e.g., high beam, low beam, turn signal, etc. in an automobile), where each of the load devices are associated with respective addresses so that each of the devices can be selectively coupled to a power (e.g., 110 volt) supply. Transceivers in the components 102 and 104, and more particularly in 104, would thus allow data regarding the status of each of the devices to be individually relayed back.

Figure 2:
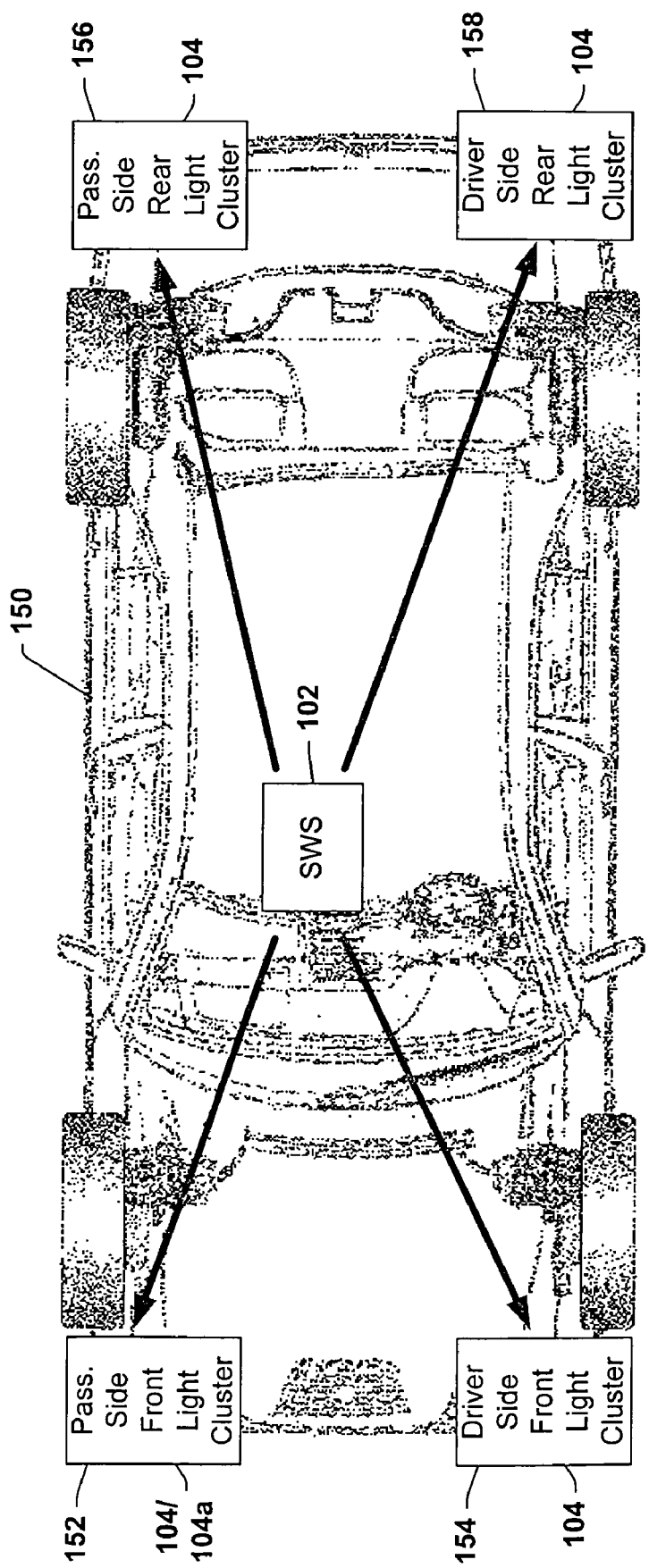
FIG. 2 is a plan view of a vehicle illustrating a lighting application for one or more aspects of the present invention.

Turning to FIG. 2, an implementation of one or more switch components 102 and one or more control module components 104 in a vehicle is illustrated according to one or more aspects of the present invention. In the illustrated example, one or more switch components 102 are centrally located within the vehicle 150, such as on the steering column of the vehicle 150 for selective manipulation by a driver of the vehicle, for example. One or more control module components 104 are located at the four corners of the vehicle 152, 154, 156 and 158 within respective lighting clusters. For example, three respective control modules may be operatively associated with load devices of a high beam, low beam and right turn signal, respectively, in the passenger side front light cluster 152. Alternatively, all three of these loads may be operatively coupled to a single control module 104a, where the control module can independently control the different loads, such as where respective addresses are associated with the different loads, for example.

During operation, the driver of the vehicle can move a lever on the steering column to activate the right turn signal, where moving the lever causes a switch 108 (FIG. 1) within the switch component 102 to close or otherwise change state so that a signal is resultantly broadcast by the switch component 102 indicating that the load of the right turn signal is to be activated. This signal is picked up by the control module 104 associated with the right turn signal, where the signal component 102, signal, load and/or control module 104 have associated addresses that match up, so that a supply is selectively coupled to the load to activate the turn signal. The control module 104 and the switch component 102 may also have transceivers so that a signal can be sent from the control module component 104 back to the switch component 102 so that the status of the load is indicated to the driver, such as in the form of a light that flashes on the dashboard of the vehicle in synch with the turn signal, for example.

It will be appreciated that implementing such a wireless communication and/or control system in automotive applications has numerous advantageous. For example, a wiring harness is generally required to provide power and a path for signals used for communication, sensing and/or actuations in automotive applications. Where, as described above, clusters of load devices, such as high beams, low beams and turn signals are used, for example, one or more relatively high gauge wires have to be installed for, among other things, a relatively high (e.g., several ampere) current supply for the devices. This wiring is expensive, heavy and labor intensive to install, particularly where the wiring has to be routed through hard to reach places. Accordingly, reducing the amount of wiring necessary in a vehicle, as provided for by one or more aspects of the present invention, is an attractive prospect since it can reduce costs associated with producing, operating and maintaining vehicles. For example, in addition to reducing the cost of raw materials necessary for producing a vehicle, reducing the amount of wiring in the vehicle can lighten the vehicle, which translates into fuel savings. Additionally, switch 102 and control module 104 components described herein can be integrated into vehicles as modular components that can be easily and inexpensively swapped into and out of vehicles (e.g., where they become outdated and/or where one or more associated load device are not operating properly). Accordingly, outfitting a vehicle with one or more switch 102 and control module components 104 as described herein leads to a more economical vehicle that is easier and less costly to operate and maintain.

Although the invention has been shown and described with respect to one or more implementations, equivalent alterations and modifications will occur to others skilled in the art based upon a reading and understanding of this specification and the annexed drawings. The invention includes all such modifications and alterations. With regard to the various functions performed by the above described components (assemblies, devices, circuits, etc.), the terms (including reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term "exemplary" as utilized herein merely means an example, rather than the best.

What is claimed is:

1. A system that facilitates wireless control over a load device, comprising:
   a wireless switch component configured to wirelessly send a control signal; and
   a control module component operatively coupled to the load device and configured to control the load device in response to the wireless control signal from the wireless switch component,
   where the control module component comprises;
      a control module transmitter operative to transmit signals indicative of the state of the load device;
   where the wireless switch component comprises;
      a power supply,
      a switch operatively coupled to the power supply,
      a switch state interpreter operatively coupled to the switch, a coupling of the switch state interpreter to the power supply dependent upon the state of the switch,
      a second transmitter operatively coupled to the switch state interpreter, and
      a transmitter antenna operatively coupled to the transmitter,
      a receiver operative to receive signals indicative of the state of the load device,
         where the switch state interpreter identifies a change in the state of the switch and causes the wireless control signal to be generated via the transmitter and the transmitter antenna.

2. The system of claim 1, where the switch state interpreter comprises at least one of a state machine, micro controller and ASIC.

3. The system of claim 2, where at least one of the wireless switch component, the control module component and the load device have an associated identifying address that facilitates specifically directed communications.

4. The system of claim 3, where the control module component comprises:
   a receiver antenna,
   a receiver operatively coupled to the receiver antenna to facilitate reception of the wireless control signal generated by the wireless switch component,
   a switch state control signal interpreter operatively coupled to the receiver to receive and interpret the wireless control signal from the wireless switch component, and
   a control switch operatively coupled between the switch state control signal interpreter, a high voltage supply and the load device,
      where the switch state control signal interpreter causes the control switch to selectively couple the high voltage supply and the load device to one another based upon the wireless control signal generated by the wireless switch component.

5. The system of claim 4, where the switch state control signal interpreter comprises at least one of a state machine, micro controller and ASIC.

6. The system of claim 5, where at least one of the switch state interpreter and the switch state control signal interpreter comprise an associated identifying address.

7. The system of claim 6, wherein
   the control module component further comprises a voltage regulator operatively coupled to the high voltage supply and configured to output a regulated voltage to supply the switch state control signal interpreter.

8. The system of claim 7, where at least one of the transmitter is a UHF transmitter and the receiver is a UHF receiver.

9. The system of claim 7, where the power supply comprises a battery.

10. A system that facilitates wireless control over a load device, comprising:
    a wireless switch component configured to wirelessly send a control signal, and
    a control module component operatively coupled to the load device and configured to control the load device in response to the wireless control signal from the switch component,
    where the wireless switch component comprises;
       a power supply,
       a switch operatively coupled to the power supply,
       a switch state interpreter operatively coupled to the switch, a coupling of the switch state interpreter to the power supply dependent upon the state of the switch,
       a receiver operative to receive signals indicative of the state of the load device,
       a transmitter operatively coupled to the switch state interpreter, and
       a transmitter antenna operatively coupled to the transmitter,
          where the switch state interpreter identifies a change in the state of the switch and causes the wireless control signal to be generated via the transmitter and the transmitter antenna, where the control module component comprises;
a receiver antenna,
a receiver operatively coupled to the receiver antenna to facilitate reception of the wireless control signal generated by the wireless switch component,
a control module transmitter operative to transmit signals indicative of the state of the load device,
a switch state control signal interpreter operatively coupled to the receiver to receive and interpret the wireless control signal from the wireless switch component, and
a control switch operatively coupled between the switch state control signal interpreter, a high voltage supply and the load device,
where the switch state control signal interpreter causes the control switch to selectively couple the high voltage supply and the load device to one another based upon the wireless control signal generated by the wireless switch component.

11. The system of claim 10, where at least one of the switch state interpreter and the switch state control signal interpreter comprise at least one of a state machine, micro controller and ASIC.

12. The system of claim 11, where at least one of the wireless switch component, the control module component and the load device have an associated identifying address that facilitates specifically directed communications.

13. The system of claim 12, where at least one of the switch state interpreter and the switch state control signal interpreter comprise an associated identifying address.

14. The system of claim 11, where at least one of
the power supply comprises a battery,
the regulated voltage is about 5 volts D.C.,
the high voltage supply is about 110 volts A.C.,
the transmitter is a UHF transmitter,
the receiver is a UHF receiver, and
the control module component further comprises a voltage regulator operatively coupled to the high voltage supply and configured to output a regulated voltage to supply the switch state control signal interpreter.

15. The system of claim 11, where the system is implemented in a motor vehicle such that the state of the switch of the wireless switch component can be manipulated by an occupant of the vehicle to control a component of the motor vehicle.

16. A wireless switch component configured to wirelessly send a control signal for controlling a load device, comprising:
a power supply,
a switch operatively coupled to the power supply,
a switch state interpreter operatively coupled to the switch,
a coupling of the switch state interpreter to the power supply dependent upon the state of the switch,
a receiver operative to receive signals indicative of the state of the load device,
a transmitter operatively coupled to the switch state interpreter, and
a transmitter antenna operatively coupled to the transmitter,
where the switch state interpreter identifies a change in the state of the switch and causes the wireless control signal to be generated via the transmitter and the transmitter antenna.

17. The switch component of claim 16, where the switch state interpreter comprises at least one of a state machine, micro controller and ASIC.

18. The switch component of claim 16, where the switch component has an associated identifying address that facilitates specifically directed communications.

19. A control module component configured to control an associated load device in response to a wirelessly received control signal, comprising:
a receiver antenna,
a receiver operatively coupled to the receiver antenna to facilitate reception of the wireless control signal generated by a wireless switch component,
a switch state control signal interpreter operatively coupled to the receiver to receive and interpret the wireless control signal from the wireless switch component,
a control switch operatively coupled between the switch state control signal interpreter, a high voltage supply and the load device,
where the switch state control signal interpreter causes the control switch to selectively couple the high voltage supply and the load device to one another based upon the wireless control signal,
a voltage regulator operatively coupled to the high voltage supply and configured to output a regulated voltage to supply the switch state control signal interpreter, and
a control module transmitter operative to transmit signals indicative of a state of the load device.

20. The control module component of claim 19, where the switch state control signal interpreter comprises at least one of a state machine, micro controller and ASIC.

21. The control module component of claim 19, where the control module component has an associated identifying address that facilitates specifically directed communications.

22. A vehicular wireless control system that facilitates wireless control over a vehicle load device, comprising:
a wireless switch component configured to wirelessly send a control signal, and
a control module component operatively coupled to the vehicle load device and configured to control the vehicle load device in response to the wireless control signal from the switch component,
where the wireless switch component comprises;
a power supply,
a switch operatively coupled to the power supply,
a switch state interpreter operatively coupled to the switch, a coupling of the switch state interpreter to the power supply dependent upon the state of the switch,
a receiver operative to receive signals indicative of the state of the load device,
a transceiver operatively coupled to the switch state interpreter, and
a transceiver antenna operatively coupled to the transmitter,
where the switch state interpreter identifies a change in the state of the switch and causes the wireless control signal to be generated via the transceiver and the transceiver antenna,
where the control module component comprises;
a transceiver antenna,
a transceiver operatively coupled to the transceiver antenna to facilitate reception of the wireless control signal generated by the wireless switch component,
a control module transmitter operative to transmit signals indicative of the state of the load device,
a switch state control signal interpreter operatively coupled to the transceiver to receive and interpret the wireless control signal from the wireless switch component, and a control switch operatively coupled between the switch state control signal interpreter, a high voltage supply and the vehicle load device,
where the switch state control signal interpreter causes the control switch to selectively couple the high voltage supply and the vehicle load device to one another based upon the wireless control signal generated by the wireless switch component.

23. The system of claim 22, where at least one of: the switch state interpreter and the switch state control signal interpreter comprise at least one of a state machine, micro controller and ASIC.

24. The system of claim 23, where at least one of the wireless switch component, the control module component and the vehicle load device have an associated identifying address that facilitates specifically directed communications.

25. The system of claim 24, where at least one of
the switch of the wireless switch component is located within the vehicle for selective manipulation by a user of the vehicle, and
the load comprises one or more components of a light cluster of the vehicle.

26. The system of claim 1, wherein the change in the state of the switch comprises changing the switch from a closed state to an open state.

* * * * *